Dec. 26, 1967     J. J. PEFFER     3,360,276
AUTOMATIC SCREW MACHINE TUBE STOCK EXTENSION MEANS
Filed June 10, 1965     2 Sheets-Sheet 1
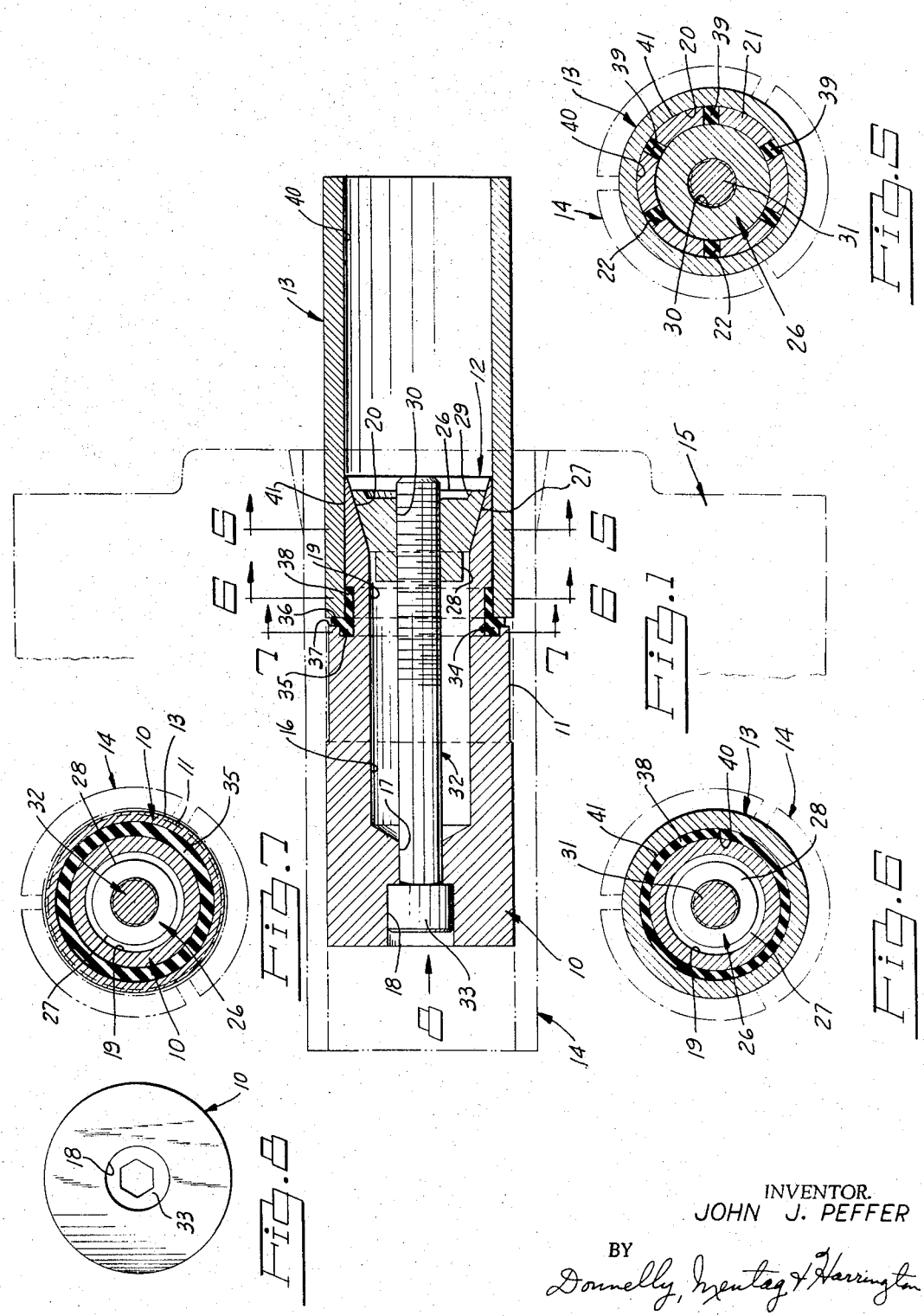
INVENTOR.
JOHN J. PEFFER
BY
Donnelly, Mentag & Harrington
ATTORNEYS

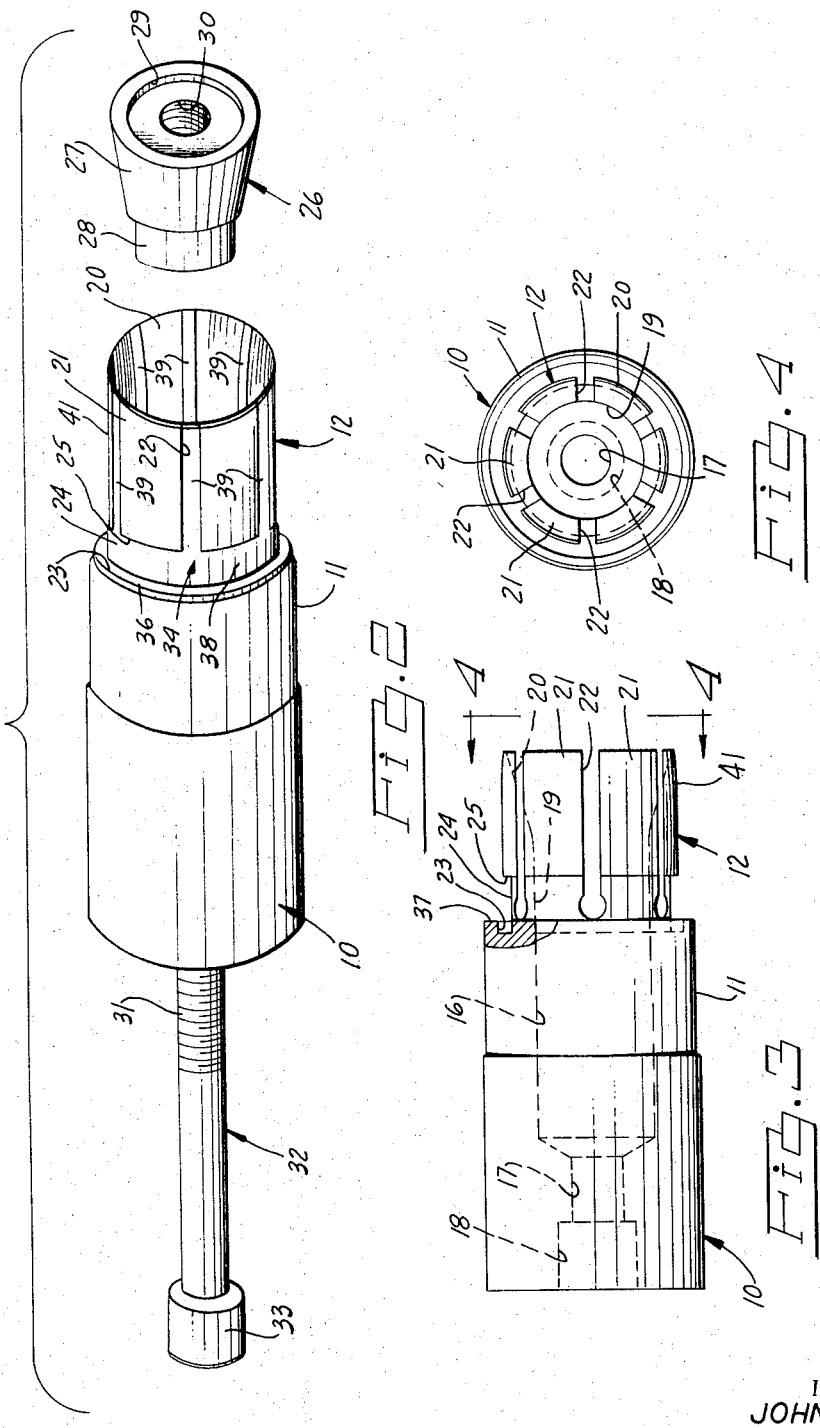

United States Patent Office 3,360,276
Patented Dec. 26, 1967

3,360,276
AUTOMATIC SCREW MACHINE TUBE STOCK
EXTENSION MEANS
John J. Peffer, 3303 Grange Road,
Trenton, Mich. 48183
Filed June 10, 1965, Ser. No. 462,957
3 Claims. (Cl. 279—2)

ABSTRACT OF THE DISCLOSURE

A holder for tubular workpieces comprising an elongated body member, a collet integrally formed on one end of said body member and extended axially therefrom, said collet including a plurality of spaced apart flexible members which are adapted to move radially outward into gripping engagement with the internal surface of a tubular workpiece for holding the tubular workpiece in place on the collet during a machining operation, an expander member mounted within the movable members, a fluid sealing means disposed between the movable members and about the periphery of said collet at the juncture point with the body, and means engageable with the expander member for moving the expander member to move the collet movable members radially outward into gripping engagement with the internal surface of a tubular workpiece.

---

This invention relates generally to workpiece holders and more particularly, to a novel and improved tube stock holder for use with automatic screw machines and the like.

In the machining of tube stock by automatic machine screws, its is a common occurrence to scrap pieces of tube stock from six inches in length and upwards because of the lack of a suitable means for gripping the tube end remnants to permit additional cuts to be made on the tube end remnants. Heretofore, various types of devices have been provided in an attempt to hold the remnant tube ends so that additional machining cuts could be made. Such prior art devices have proven to be expensive and heavy in weight. In view of the foregoing, it is an important object to provide a novel and improved tube stock holder and extension means which is adapted to overcome the disadvantages of the prior art tube stock holders.

It is another object of the present invention to provide a novel and improved tube stock holder which is adapted to extend the length of a bar of tube stock on the last feed-out step in an automatic screw machine.

It is a further object of the present invention to provide a novel and improved tube stock extension means which is adapted to grip the remnant ends of tubular workpieces to permit making additional cuts on the workpieces, thereby reducing scrap to a minimum.

It is still another object of the present invention to provide a novel and improved tube stock extension means which is simple and compact in construction, economical of manufacture and efficient in operation.

It is still a further object of the present invention to provide a novel and improved tube stock extension means which may be made with a minimum of parts, and which can be easily inserted and removed from an automatic screw machine to save machine down-time.

It is still another object of the present invention to provide a novel and improved tube stock extension means which can be used on all types of automatic screw machines and for any size tube stock, and which is lightweight in construction due to a one-piece or unitary body structure, and which may be made from a single type of material instead of two or three types as in the prior art tubular stock holders.

It is still a further object of the present invention to provide a novel and improved tube stock holder which is adapted to prevent coolant, as for example oil, and chips or other foreign elements from passing through the tube stock workpieces and falling on the floor around the automatic screw machine.

Other objects, features and advantages of this invention will be apparent from the following detailed description, appended claims, and the accompanying drawings.

In the drawings:

FIG. 1 is a longitudinal sectional view of a tube stock extension means made in accordance with the principles of the present invention and showing a workpiece retained thereon;

FIG. 2 is an exploded view of the tube stock extension means shown in FIG. 2;

FIG. 3 is a side elevational view of the unitary body and collet structure of the tube stock extension means illustrated in FIGS. 1 and 2;

FIG. 4 is a right end elevational view of the structure illustrated in FIG. 3, taken along the line 4—4 thereof, and looking in the direction of the arrows;

FIG. 5 is an elevational section view of the structure illustrated in FIG. 1, taken along the line 5—5 thereof, and looking in the direction of the arrows;

FIG. 6 is an elevational section view of the structure illustrated in FIG. 1, taken along the line 6—6 thereof, and looking in the direction of the arrows;

FIG. 7 is an elevational section view of the structure illustrated in FIG. 1, taken along the line 7—7 thereof, and looking in the direction of the arrows; and FIG. 8 is a left end elevational view of the structure illustrated in FIG. 1, taken in the direction of the arrow marked "8."

Referring now to the drawings, and in particular to FIGS. 1 and 2, the reference numeral 10 generally designates the body of the tube stock extension means of the present invention. The forward or front end of the body 10 is provided with the reduced outer periphery as indicated by the numeral 11. The body 10 is substantially cylindrical in over-all configuration.

The numeral 12 generally designates a collet which is formed integrally with the body 10, as more fully described hereinafter. The numeral 13 generally designates a short piece of tube stock which is internally gripped by the collet 12. The numeral 14 generally designates the workpiece holder of an automatic screw machine. The numeral 15 generally designates a conventional chuck of an automatic screw machine.

As shown in FIGS, 1, 2 and 3, the body 10 is cylindrical in shape and is provided with the internal bore 16 which extends inwardly from the right end thereof, as viewed in FIGS. 1, 2 and 3. The enlarged bore 16 terminates at its inner end in the reduced bore 17 which communicates with the recess 18 on the left end or rear end of the body 10, as viewed in FIGS. 1, 2 and 3. As shown in FIGS. 1 and 3, the bore 16 continues outwardly to the right, into the collet 12 and this extension of the bore 16 is indicated by the numeral 19. The bore 19 in the collet 12 terminates at the outer end thereof in the conical or outwardly diverging internal surface 20.

As shown in FIGS. 1, 2 and 3, the collet 12 includes a plurality of spaced apart, peripherally disposed, elongated gripping members or lugs indicated by the numeral 21. The collet members 21 are spaced apart by the saw slots 22 which terminate at the inner ends thereof at drilled holes as shown in FIG. 3.

As best seen in FIG. 3, the body 10 is provided on the forward end thereof with an annular recess 23 which faces the collet 12. As best seen in FIG. 3, the inner periphery of the annular recess 23 meets and is aligned with the reduced cylindrical inner end portion 24 of the collet 12. The reduced collet portion 24 terminates at the shoulder 25 on the remainder portion of the collet 12 which is formed with an enlarged diameter as indicated by the numeral 41.

As shown in FIGS. 1 and 2, the tube stock extension means of the present invention includes a expander means, generally indicated by the numeral 26. The expander means 26 comprises a substantially cylindrical body having an enlarged front end with the rearwardly tapering surface 27. The surface 27 provides the expander 26 with a substantially truncated appearance. The surface 27 diverges toward the front end of the expander, which is to the right side of the expander, as viewed in FIGS. 1 and 2. Integrally formed on the rear end of the front tapered portion of the expander 26 is the cylindrical stub shaft portion 28. The front end of the expander 26 is provided with an annular recess 29. As shown in FIG. 1, the expander 26 is provided with a threaded bore formed through the expander in a central or axial position.

FIG. 1 shows the expander 26 seated in its operative position inside of the collet 12 so that its outer tapered surface 27 is seated on the tapered internal surface 20 of the collet 12. It will be seen, that when the expander 26 is moved inwardly, or to the left as viewed in FIG. 1, the collet fingers or gripping lugs 21 will be moved outward radially into gripping engagement with the inner surface 40 of the workpiece 13.

As shown in FIG. 1, the expander 26 is adapted to be moved axially inward or outward by a bolt, generally indicated by the numeral 32. The bolt 32 is provided with the inner threaded end 31 which is threadably mounted in the threaded bore 30 in the expander 26. The enlarged head 33 of the bolt 32 is adapted to be seated in the recess 18. It will be seen that when the bolt 32 is threaded in a proper manner to draw the expander 26 inwardly of the collet, or to the left as viewed in FIG. 1, the collet will grip the workpiece 13 in a secure manner for holding a workpiece 13 in a fixed position for machining operations on the workpiece.

As shown in FIG. 1, the tube stock extension means is provided with a sealing member, generally indicated by the numeral 34, which is adapted to prevent coolant such as oil, and chips and other foreign elements, from passing through the workpiece 13 and out through the abutting ends of the workpiece 13 in the front end of the body 10 and on through the floor where the automatic screw machine may be positioned. The sealing member 34 is made from a suitable sealing material. One suitable material is a "neoprene" rubber which is molded in place in the annular recess 23 as indicated by the numeral 35. The sealing material 34 extends radially outward, as indicated by the numeral 36, over the shoulder 37 formed on the right end of the body 10 adjacent the annular recess 23. As shown in FIG. 1, the sealing material 34 extends axially along the reduced portion 24 of the collet 12 and into abutting engagement with the shoulder formed on the rear end of the enlarged diameter portion 41 of the collet 12. The last mentioned portion on the collet 12 is indicated by the numeral 38. As shown in FIGS. 2 and 5, by the numeral 39, the sealing material 34 is also extended axially throughout the length of the collet slots 22 for sealing against leakage through these slots.

It will be seen from the foregoing that the tube stock extension means of the present invention employs a simplified unitary or one-piece body and collet construction, and these parts may be made from the same material as, for example, a suitable steel instead of using two or more types of material as in the prior art devices. The one-piece construction eliminates excessive weight and it can be made to suit all types of automatic screw machines and all sizes of tubing. It will be understood that the expanding parts 21 of the collet are adapted to expand and grip various sizes of tube stock on the inside diameter or internal surface of the same. The workpiece 13 may be quickly and easily mounted over the collet 12 and seated against the sealing member 34 in a quick and easy manner which saves down-time in the use of automatic screw machines. In the past, the stock remnants or ends of the tube stock which were scrapped were at least six inches and upwards in length. This loss of material is caused by the lack of a proper means for gripping the tube ends for making additional machine cuts. With the device of the present invention, it will be seen that the scrap end of the tube stock is reduced to a practical minimum.

Experience has shown that the tube stock extension means of the present invention is a simple and compact device which is economical to manufacture because of its simplified construction, and which is efficient in operation.

While it will be apparent that the preferred embodiment of the invention herein disclosed is well calculated to fulfill the objects above stated, it will be appreciated that the invention is susceptible to modification, variation and change without departing from the proper scope or fair meaning of the subjoined claims.

What I claim is:
1. A holder for tubular workpiece comprising:
 (a) an elongated body member;
 (b) a collet integrally formed on one end of said body and extended axially therefrom;
 (c) said collet including a plurality of spaced apart, radially disposed flexible members which are adapted to be moved radially outward into gripping engagement with the internal surface of a tubular workpiece for holding the tubular workpiece in place on the collet;
 (d) an expander member mounted within said movable members;
 (e) a fluid sealing means disposed in the spaces between each of said movable members and about the periphery of said collet at the junction with said body; and,
 (f) means operatively mounted in said body engageable with said expander member for moving the expander member to move said collet movable members radially outward into gripping engagement with the internal surface of a tubular workpiece.

2. A holder for tubular workpieces as defined in claim 1, wherein:
 (a) said means for moving said expander member comprises a bolt rotatably mounted in said body member and having one end threadably engaged with said expander member, whereby when the bolt is turned in one direction, the expander member will be moved to move the collet movable members to an operative workpiece gripping position, and when the bolt is turned in the other direction the expander member will be moved in the other direction to permit the collet movable members to move to the inoperative position.

3. A holder for tubular workpieces as defined in claim 1, wherein:
 (a) said radially disposed movable collet members are each connected to the elongated body at one end thereof with the other end thereof being free to be moved radially outward into gripping engagement with the internal surface of a tubular workpiece;

(b) the internal surfaces of the radially disposed movable collet members being tapered; and, (c) said expander member being provided with a tapered surface complementary to the tapered surfaces on the radially disposed movable collet members so that when the expander member is moved in one direction, the movable collet members will be moved outwardly, and when the expander member is moved in the other direction, the movable collet members will spring inwardly.

References Cited

UNITED STATES PATENTS 1,003,922   9/1911   Larson _____ 10—107

FOREIGN PATENTS 482,766   4/1938   Great Britain.

ROBERT C. RIORDON, *Primary Examiner.*

LESTER M. SWINGLE, *Examiner.*

E. A. CARPENTER, *Assistant Examiner.*